United States Patent
Asano

(10) Patent No.: US 6,531,530 B2
(45) Date of Patent: Mar. 11, 2003

(54) NON HALOGEN, ORGANIC OR INORGANIC FLAME RETARDANTS IN THERMOPLASTIC POLYMER BLENDS

(75) Inventor: Takayuki Asano, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 118 days.

(21) Appl. No.: 09/746,181

(22) Filed: Dec. 21, 2000

(65) Prior Publication Data

US 2001/0007888 A1 Jul. 12, 2001

(30) Foreign Application Priority Data

Dec. 28, 1999 (JP) .......................... 11-372771
Nov. 24, 2000 (JP) ........................ 2000-358001

(51) Int. Cl.[7] .................... C08K 9/10; C08K 9/04; C08K 3/32; C08K 5/49; C08K 5/3492
(52) U.S. Cl. .................. 524/414; 523/200; 523/205; 523/351; 524/100; 524/101; 524/126; 524/127; 524/128; 524/140; 524/141; 524/145; 524/147; 524/153
(58) Field of Search ................. 524/100, 101, 524/126, 127, 128, 140, 141, 145, 147, 153, 414; 523/205, 200, 351

(56) References Cited

U.S. PATENT DOCUMENTS

| | | | | |
|---|---|---|---|---|
| 4,248,976 A | * | 2/1981 | Clubley et al. | 524/141 |
| 4,962,148 A | * | 10/1990 | Orikasa et al. | 524/436 |
| 5,726,227 A | * | 3/1998 | Magerstedt et al. | 524/107 |
| 5,795,930 A | * | 8/1998 | Fukumura et al. | 524/100 |
| 6,025,421 A | * | 2/2000 | Aterashi et al. | 524/151 |
| 6,228,912 B1 | * | 5/2001 | Campbell et al. | 524/100 |
| 6,255,371 B1 | * | 7/2001 | Schlosser et al. | 524/126 |
| 6,344,158 B1 | * | 2/2002 | Schlosser et al. | 524/116 |
| 6,365,071 B1 | * | 4/2002 | Jerewein et al. | 524/126 |

FOREIGN PATENT DOCUMENTS

| | | | |
|---|---|---|---|
| GB | 199 03 709 | * | 8/2000 |
| GB | 199 33 901 | * | 2/2001 |
| JP | 50-23448 | | 3/1975 |
| JP | 10-298395 | | 11/1998 |

* cited by examiner

Primary Examiner—Peter Szekely
(74) Attorney, Agent, or Firm—Flynn, Thiel, Boutell & Tanis, P.C.

(57) ABSTRACT

The present invention provides a flame retardant resin composition having excellent impact resistance, heat resistance, dimensional stability, and flame retardance. That is, it provides a flame retardant resin composition made up of:

- 100 parts by weight of a thermoplastic resin (A) containing:
  - 80 to 10% by weight of (A-1) at least one of an aromatic polyester resin and a polyamide resin,
  - 17 to 85% by weight of at least one of a rubber-containing copolymer of a vinyl cyanide and an aromatic vinyl (A-2) and a copolymer of a vinyl cyanide and an aromatic vinyl (A-3) and
  - 3 to 40% by weight of (A-4) at least one of a polyphenylene ether resin and a polyphenylene sulfide resin,
- 1 to 60 parts by weight of a non-halogen, organic or inorganic flame retardant (B) and
- 100 parts by weight or less of a filler (C).

14 Claims, No Drawings

NON HALOGEN, ORGANIC OR INORGANIC FLAME RETARDANTS IN THERMOPLASTIC POLYMER BLENDS

FIELD OF THE INVENTION

The present invention relates to a flame retardant resin composition having excellent impact resistance, heat resistance, dimensional stability and flame retardance in the resulting molded articles, a process for producing the composition and molded articles obtained from the composition.

PRIOR ART

Aromatic polyester resins are widely used as engineering plastics having excellent mechanical properties in the field of the appliance industry. However, although the resins are excellent in mechanical properties such as heat resistance, the resins are poor in dimensional stability of products produced by injection molding, having a problem in that use for members requiring dimensional accuracy is limited.

In order to solve this problem, a composition consisting of a polyester resin, an ABS resin, and an inorganic filler is proposed, for example, in JP-A 50-23448. However, since most plastics are flammable, in order to ensure a safety from flame, high flame retardance can be required, for example, which corresponds to V-0 in evaluation according to the vertical flammability test of the U.S. Underwriters' Laboratories (UL) Standard (Hereinafter referred to as UL94 Standard). Accordingly, a halogen flame retardant represented by bromine compounds and antimony oxide in general are blended with a thermoplastic resin to increase the flame retardance. However, there is probability that resins containing the halogen flame retardant may burn to generate dioxins, which may give a bad effect to the environment. Therefore, non-halogen, organic flame retardant resins have been strongly demanded as a recent tendency.

A flame retardant resin composition consisting of a vinyl copolymer, a polyester and/or a polyamide and a phosphorus flame retardant having a phosphorus content of 15% by weight or more is proposed, for example, in JP-A 10-298395. This composition is insufficient in heat resistance, represented by a heat deflection temperature, and in addition, a large amount of a flame retardant must be added in order to impart high flame retardance such as V-0 in UL-94. However, when red phosphorus exemplified in the Example is added in a large amount as a flame retardant, the red phosphorus itself burns in combustion so that conversely, the flame retardance decreases, which produces a problem in that there is a probability of generating a large amount of phosphine gas in fabrication.

DISCLOSURE OF THE INVENTION

An object of the invention is to provide a flame retardant resin composition having excellent capabilities such as impact resistance, heat resistance, dimensional stability and the like, and also having an excellent flame retardance in molded articles, a process for the preparation thereof, and molded articles obtained therefrom.

The invention, as a means for solution, provides a flame retardant resin composition comprising:
100 parts by weight of a thermoplastic resin (A) comprising:
    80 to 10% by weight of (A-1) at least one of an aromatic polyester resin and a polyamide resin,
    17 to 85% by weight of at least one of a rubber-containing copolymer of a vinyl cyanide and an aromatic vinyl (A-2) and a copolymer of a vinyl cyanide and an aromatic vinyl (A-3) and
    3 to 40% by weight of (A-4) at least one of a polyphenylene ether resin and a polyphenylene sulfide resin,
1 to 60 parts by weight of a non-halogen, organic or inorganic flame retardant (B) and
100 parts by weight or less of a filler (C).

The present invention, as another means for solution, provides a process for producing the above-mentioned flame retardant resin composition, which comprises blending red phosphorus with at least one base resin selected from the aromatic polyester resin, the rubber-containing copolymer of a vinyl cyanide and an aromatic vinyl copolymer, the copolymer of a vinyl cyanide and an aromatic vinyl copolymer and the polyphenylene ether resin to obtain a masterbatch, and then melting and kneading the masterbatch with the other components.

The present invention further provides a molded article obtained by injection-molding the above-mentioned flame retardant resin composition.

DETAILED DESCRIPTION OF THE INVENTION

The aromatic polyester resins of component (A-1) of the invention are saturated polyester resins obtained according to known procedures through polycondensation of divalent or more carboxylic acids or the derivatives thereof having a capability to form esters with a dihydric or more alcohol component and/or phenol component or the derivatives thereof having a capability to form esters.

The aromatic polyester resins of component (A-1) include polyalkylene terephthalates such as polyethylene terephthalate, polybutylene terephthalate, and polyhexamethylene terephthalate etc., and polyalkylene naphthalates such as polyethylene naphthalate and polybutylene naphthalate, etc. In addition, component (A-1) can be copolyesters containing 50% by weight or more of alkylene arylate units or mixtures containing 50% by weight or more of alkylene arylate units in total. The aromatic polyester resins are preferably polyethylene terephthalate and polybutylene terephthalate because the resins are particularly excellent in balance of capabilities of molding properties, heat resistance, etc.

The molecular weight of the aromatic polyester resins of component (A-1) can be preferably selected from the range of about 10,000 to about 100,000 and more preferably about 15,000 to about 500,000 in weight average molecular weight.

The aromatic polyester resins of component (A-1) can be of a straight chain or branched chain structure, can be crosslinked, or can be used singly or in a combination of two or more thereof. It is desirable that in the aromatic polyester resins of component (A-1), particularly, use of a combination of polyethylene terephthalate and polybutylene terephthalate allows improvement in dimensional stability by the action of polybutylene terephthalate and improvement in appearance of the molded articles by the action of polyethylene terephthalate. The content ratio of these is preferably from 5/95 to 80/20 and more preferably from 10/90 to 50/50 in polyethylene terephthalate/polybutylene terephthalate.

The polyamide resins of component (A-1) include polyamide resins and the copolymers thereof formed from diamines and dicarboxylic acids; specifically, nylon 66, polyhexamethylene sebacamide (nylon 6·10), polyhexamethylene dodecanamide (nylon 6·12), polydodecamethylene dedecanamide (nylon 1212), polymethaxylylene adipamide (nylon MXD6), polytetramethylene adipamide (nylon 46), and the mixtures or copolymers of these; copolymers such as nylon 6/66, nylon 66/6T containing 50 mole % or less of component 6T (6T: polyhexamethylene terephthalamide), nylon 66/6I containing 50 mole % or less of component 6I (6I: polyhexamethylene isophthalamide), nylon 6T/6I/66, nylon 6T/6I/610 etc.; copolymers of polyhexamethylene terephthalamide (nylon 6T), polyhexamethylene isophthalamide (nylon 6I), poly(2-methylpentamethylene) terephthalamide (nylon M5T), poly(2-methylpentamethylene) isophthalamide (nylon M5I), nylon 6T/6I, nylon 6T/M5T etc., and moreover, copolymerized nylons such as amorphous nylon also can be used. Amorphous nylon includes a polycondensation product of terephthalic acid with trimethylhexamethylenediamine and the like.

Furthermore, the ring opening polymerization products of cyclic lactams, the polycondensation products of aminocarboxylic acids and copolymers consisting of these components, specifically aliphatic polyamide resins and the copolymers thereof such as nylon 6, poly-ω-undecanamide (nylon 11), poly-ω-dodecanamide (nylon 12) etc.; and polyamides consisting of diamines and dicarboxylic acids and the copolymers thereof, specifically nylon 6T/6, nylon 6T/11, nylon 6T/12, nylon 6T/6I/12, nylon 6T/6I/610/12 etc., and the mixtures of these are included.

The content ratio of component (A-1) contained in the compositions is from 80 to 10% by weight, preferably from 80 to 30% by weight, and more preferably from 75 to 35% by weight. The content ratio within this range can impart high heat resistance, flame retardance, and dimensional stability.

Component (A-2) used in the invention is rubber-containing vinyl cyanide/aromatic vinyl copolymers.

The aromatic vinyl compounds include styrene, styrene compounds (e.g., alkylstyrenes (e.g., vinyl toluenes such as o-, m- and p-methylstyrene, 2,4-dimethylstyrene etc., and alkyl-substituted styrenes such as ethylstyrene, p-isopropylstyrene, butylstyrene, p-t-butylstyrene etc.), α-alkyl-substituted styrenes (e.g., α-methylstyrene, α-methyl-p-methylstyrene etc.), halostyrenes (e.g., o-, m- and p-chlorostyrene etc.)), and the like. Among these, styrene, vinyl toluene and α-methylstyrene are preferred. Vinyl cyanide compounds include acrylonitrile, methacrylonitriles and the like.

The ratio (weight ratio) of the aromatic vinyl compounds and the vinyl cyanide compounds is preferably from 90/10 to 60/40 and more preferably from 85/15 to 65/35.

Furthermore, component (A-2) can be copolymers of aromatic vinyl compounds with copolymerizable monomers. Examples thereof include one or two or more selected from alkyl (meth)acrylates ($C_1$–$C_{10}$ alkyl (meth)acrylates such as methyl (meth) acrylate etc.), vinyl ester monomers (vinyl acetate etc.) hydroxyl group-containing monomers (hydroxy $C_1$–$C_4$alkyl (meth)acrylates such as hydroxylethyl methacrylate, hydroxypropyl (meth)acrylate etc.), glycidyl group-containing monomers (glycidyl (meth)acrylate etc.), carboxyl group-containing monomers (α,β-unsaturated carboxylic acids such as (meth)acrylic acid, maleic anhydride, fumaric acid etc.) and imide monomers (maleimide, N-methylmaleimide, N-phenylmaleimide etc.).

The amount of these copolymerizable monomers used is preferably from 5 to 30% by weight and more preferably from 5 to 25% by weight to polymerizable monomers composing component (A-2) (that is, the total amount of the aromatic vinyl compounds and the vinyl cyanide compounds).

The content of the copolymers (a portion left by removing the rubber component) in component (A-2) is preferably from 40 to 99% by weight, more preferably from 50 to 97% by weight, and further preferably from 50 to 90% by weight.

The rubber component includes one or more combinations selected from a variety of rubber-quality polymers (diene rubbers such as butadiene rubber, isoprene rubber etc., styrene-diene copolymer rubber (random or block copolymers of styrene and dienes) such as styrene-butadiene rubber, styrene-isoprene rubber etc., ethylene/vinyl acetate copolymers, acrylic rubber, ethylene-propylene rubber (EPDM etc.)); the rubber components may be hydrogenated as needed. Among these, diene rubber (conjugated 1,3-diene rubber such as butadiene, isoprene etc., and the derivatives thereof etc.) and butadiene rubber (diene rubber such as butadiene rubber etc.) are preferred.

The content of the rubber component in component (A-2) is preferably from 1 to 60% by weight, more preferably from 3 to 50% by weight, and further preferably from 10 to 50% by weight.

Component (A-2) include graft copolymers where styrene and acrylonitrile are polymerized in the presence of a rubber component (e.g., an acrylonitrile/butadiene rubber/styrene graft copolymer (ABS resin), an acrylonitrile/butadiene/methyl methacrylate/styrene copolymer (AES resin), an acrylonitrile/butadiene rubber/methyl methacrylate/styrene graft copolymer (ABSM resin), acrylonitrile/acrylic rubber/styrene graft copolymer (AAS resin), an ethylene/vinyl acetate/styrene/acrylonitrile graft copolymer etc.) and the like; particularly preferably one or more combinations selected from elastic graft copolymers such as ABS resin etc.

The vinyl cyanide/aromatic vinyl copolymers of component (A-3) used in the invention include copolymers of the above-mentioned aromatic vinyl compounds (particularly, styrene) with the above-mentioned vinyl cyanide compounds (particularly, acrylonitrile). In addition, copolymers with the copolymerizable monomers as exemplified above (e.g., (meth)acrylic esters, carboxylic group-containing monomers, imide monomers, etc.) also can be used. Acrylonitrile/styrene copolymers (AS resin) and the like are preferably included.

The ratio (weight ratio) of the aromatic vinyl compounds and the vinyl cyanide compounds is preferably from 90/10 to 60/40 and more preferably from 85/15 to 65/35.

The content ratio of component (A-2) and component (A-3) in the compositions is from 17 to 85% by weight, preferably from 17 to 67% by weight and more preferably from 33 to 67% by weight in total. In this range, high impact resistance and dimensional stability can be imparted.

The polyphenylene ether resins of component (A-4) used in the present invention are homopolymers or copolymers having repeating units represented by the following formulae (III) and/or (IV). These polyphenylene ether resins can be used singly or in a combination of two or more thereof.

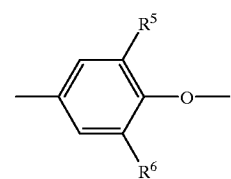

(III)

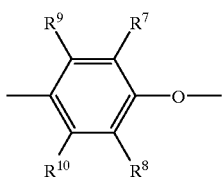

In the formulae, $R^5$, $R^6$, $R^7$, $R^8$, $R^9$ and $R^{10}$ are independent of each other and each represents an alkyl group having a carbon number of one to four (methyl, ethyl, propyl, butyl, t-butyl group etc.), an aryl group (phenyl group etc.) or a hydrogen atom; provided that $R^9$ and $R^{10}$ are not hydrogen at the same time.

The homopolymers of the polyphenylene ether resins include, for example, poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-hydroxyethyl-1,4-phenylene) ether, and the like. Poly(2,6-dimethyl-1,4-phenylene) ether is particularly preferred.

The polyphenylene ether copolymers are copolymers having phenylene ether structures as principal monomer units, and include copolymers of monomers forming the above-mentioned homopolymers (particularly, 2,6-dimethylphenol etc.) with other phenols (e.g., a copolymer of 2,6-dimethylphenol with 2,3,6-trimethylphenol, a copolymer of 2,6-dimethylphenol with o-cresol, a copolymer of 2,6-dimethylphenol with 2,3,6-trimethylphenol and o-cresol etc.).

The polyphenylene sulfide resins of component (A-4) used in the present invention are homopolymers or copolymers having repeating units represented by the following formula:

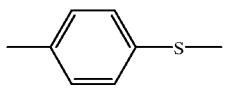

The polyphenylene sulfide resins of component (A-4) are preferably those containing 70 mole % or more of the above-mentioned repeating units, more preferably those containing 90 mole % or more thereof, and further preferably those containing 100 mole % thereof.

In the above-mentioned repeating units, the copolymerization units include constitution units including metal bond, ether bond, sulfone bond, biphenyl bond, amino group-substituted phenyl sulfide bond, carboxyl group-substituted phenyl sulfide bond, alkyl group-substituted phenyl sulfide bond, nitro group-substituted phenyl sulfide bond, phenyl group-substituted phenyl sulfide bond, alkoxy group-substituted phenyl sulfide bond, and trifunctional phenyl sulfide bond. The content of the copolymer units is preferably 30 mole % or less, more preferably 10 mole % or less, and further preferably 5 mole % or less.

The content ratio of component (A-4) in the compositions is from 3 to 40% by weight, preferably from 3 to 30% by weight, and more preferably from 5 to 30% by weight. The range can prevent deterioration in mechanical properties of the molded articles and in addition, can also prevent deterioration in stabilization of quality and in fluidity because the amount of a flame retardant used to acquire desired flame retardance is sufficiently small.

Polycarbonate resins (A-5) can be further used as the thermoplastic resin of component (A). The polycarbonate resins of component (A-5) include those obtained through reaction of divalent phenols with carbonate precursors by known solution process or melting process.

The divalent phenols include one kind or more selected from 2,2-bis(4-hydroxyphenyl)propane(bisphenol A), bis(4-hydroxyphenyl)methane, 1,1-bis(4-hydroxyphenyl)ethane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)-propane, bis(4-hydroxyphenyl)sulfide, bis(4-hydroxyphenyl)sulfone etc. Among these, bis(4-hydroxyphenyl)alkanes are preferred, and bisphenol A is particularly preferred.

The carbonate precursors include one kind or more selected from diaryl carbonates such as diphenyl carbonate etc., dialkyl carbonates such as dimethyl carbonate, diethyl carbonate etc., carbonyl halides such as phosgene etc., and haloformates such as dihaloformate of a divalent phenol etc.

Although the number average molecular weight of the polycarbonate resins is not particularly limited, it is preferable that the molecular weight ranges from about 17,000 to about 32,000 to impart mechanical strength required for practical use to the molded articles obtained from the compositions.

The ratio of component (A-5) contained in the compositions is from 3 to 40% by weight,. preferably from 5 to 40% by weight, and more preferably from 5 to 30% by weight.

The non-halogen, organic flame retardant of component (B) used in the present invention includes, for example, phosphorus flame retardants, triazine compounds, inorganic flame retardants and the like. These can be used singly or in a combination of two or more thereof.

The phosphorus flame retardants are not particularly limited as long as they are compounds having a phosphorus atom, including organic phosphorus compounds (phosphoric esters, phosphonic acid and a derivative thereof (including also a salt), phosphinic acid and a derivative thereof (including also a salt), phosphine, phosphine oxide, biphosphine, phosphonium salts, phosphagene, and phosphaphenanthrene compounds), inorganic phosphoric acid salts and the like.

Among the organic phosphorus compounds, phosphoric esters include orthophosphoric esters and the condensation products thereof, for example, such as aliphatic phosphoric esters (trimethyl phosphate, triethyl phosphate, tributyl phosphate, tri(2-ethylhexyl) phosphate, tributoxyethyl phosphate, trioleyl phosphate, dibutyl phosphate, monobutyl phosphate, di(2-ethylhexyl) phosphate, monoisodecyl phosphate, 2-acryloyloxyethyl acid phosphate etc.), aromatic phosphoric esters (triphenyl phosphate, tricresyl phosphate, trixylenyl phosphate, tris(isopropylphenyl) phosphate, tris(o-phenylphenyl) phosphate, tris(p-phenylphenyl) phosphate, trinaphthyl phosphate, cresyldiphenyl phosphate, xylenyldiphenyl phosphate, diphenyl (2-ethylhexyl) phosphate, di(isopropylphenyl) phenyl phosphate, o-phenylphenyl dicresyl phosphate, tris(2,6-dimethylphenyl) phosphate, tetraphenyl-m-phenylene diphosphate, tetraphenyl-p-phenylene diphosphate, phenyl.resorcin.polyphosphate, bisphenol A.bis(diphenyl phosphate), bisphenol A polyphenyl phosphate, dipyrocatecol hypodiphosphate etc.), aliphatic/aromatic phosphoric esters (diphenyl (2-ethylhexyl) phosphate, diphenyl 2-acryloyloxyethyl phosphate, diphenyl 2-methacryloyloxyethyl phosphate, phenyl neopentyl phosphate, pentaerythritol diphenyl diphosphate, ethyl pyrocatecol phosphate etc.) etc.

Of the organic phosphorus compounds, the phosphonic acid and a derivative thereof include, for example, aromatic phosphites (triphenyl phosphite, tris-nonylphenyl phosphite, phenyl pyrocatechol phosphite, etc.), aliphatic phosphites (tristridecyl phosphite, dibutyl hydrodiene phosphite, methyl neopentyl phosphite, pentaerythritol diethyl diphosphite, dineopentyl hypophosphite etc.) and the like, and the condensation products thereof.

Phosphinic acid salts include those represented by the following formulae (I) and/or (II):

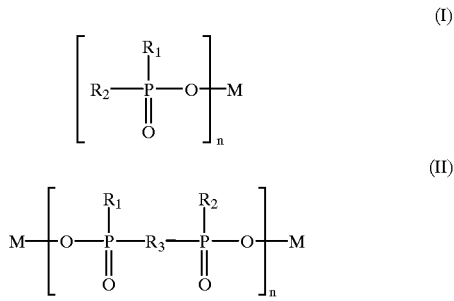

(in the formulae, $R_1$ and $R_2$ represent hydrogen atom, an alkyl group having a carbon number of 1 to 16, an ether bond-containing alkyl group having a carbon number of 1 to 16, an aryl group, an aralkyl group or a cycloalkyl group; $R_3$ represents a divalent organic group; n represents an integer of 1 or more; and M represents an atom forming a salt or an organic group).

$R_1$ and $R_2$ are preferably an alkyl group or an aralkyl group ranging from 1 to 10 in an average value of the carbon number in order to hold properly the phosphorus content of component (B-1) and heighten the effect of imparting flame retardance. Although $R_3$ is not particularly limited as long as it is a divalent organic group, preferably an alkylene group having a carbon number of 1 to 10 and —$(CH_2)_m C_6 H_4 (CH_2)_m$— (m represents a numeral of 0 or 1 or more).

The atoms forming salts or the organic groups represented by M in the formulae (I) and (II) are preferably one or two or more selected from aluminum, calcium, amide group, ammonium group, alkylammonium group and groups derived from melamine. When M is the above-mentioned atoms or organic groups, flame retardants hardly decompose in the course of processing of the compositions and in combustion, the atoms forming salts or the organic groups represented by M improve flame retardance. Such effect cannot be obtained by a metal salt of sodium phosphinate.

When the phosphinic acid salts represented by the formulae (I) and (II) are used in combination, the weight ratio is preferably from 10/90 to 30/70 in (I)/(II).

The organic phosphorus compounds include triphenylphosphine oxide, tricresylphosphine oxide, diphenyl methanephosphonate, diethyl phenylphosphonate and the like.

The inorganic phosphoric acid salts include, for example, ammonium polyphosphorate, polyphosphoric acid amide, polyphosphoratemelamine, metallic salts of phosphoric acid and the like.

The phosphorus flame retardant can be red phosphorus. The red phosphorus is that pulverized after converting yellow phosphorus, that converted from yellow phosphorus finely pulverized before conversion, and the like. That having undergone no treatment of the surface and that containing black phosphorus through aging also can be used. However, in view of safety in production, that stabilized by a coating treatment of the surface with inorganic substances such as metal oxides or metal hydroxides represented by aluminum hydroxide or magnesium hydroxide or with organic substances such as thermosetting resins, thermoplastic resins etc., or that stabilized by a metallic coating treatment of red phosphorus through electroless plating are preferably used. More preferably, thermoplastic resins as a base resin are blended as a masterbatch; this enables great improvement in stability in production and storage. However, in view of molding properties or mechanical properties, resins excellent in compatibility with the compositions of the invention are preferred. Therefore, as the base resin, use of one or two or more selected from the aromatic polyester resins, the rubber-containing vinyl cyanide/aromatic vinyl copolymers, the vinyl cyanide/aromatic vinyl copolymers, and the polyphenylene ether resins of components (A-1) to (A-4) is desired.

Furthermore, the phosphorus flame retardants can be organic phosphorus compounds (organic phosphoric esters) that have at least one ester oxygen atom linking directly to phosphorus atoms or the condensation products thereof. Such organic phosphorus compounds impart flame retardance and also allow improvement in impact resistance at the same time. Among the phosphoric esters, aromatic phosphoric esters (triphenyl phosphate, etc.) or the condensation products thereof are particularly preferred. The aromatic phosphoric esters can be those having aromatic rings substituted by a substituent group such as an alkyl group having a carbon number of 10 to 20, preferably 12 to 18, or a hydroxyl group. The aromatic phosphoric esters containing alkyl groups include bis $C_5$–$C_{10}$ alkylphenyl phenyl phosphate (bisnonylphenyl phenyl phosphate etc.), and the like. The aromatic phosphoric esters containing a hydroxyl group include phosphoric esters substituted by at least one phenolic hydroxyl group in the aromatic rings in aromatic phosphoric esters such as tricresyl phosphate, triphenyl phosphate etc., and the like. Such aromatic phosphoric esters include resorcinyl diphenyl phosphate, bisphenol A diphenyl phosphate and the like.

Combined use of the phosphoric esters (B-1) and the above-mentioned phosphinic acid salts represented by the formulae (I) and/or (II) (B-2) is preferred as the non-halogen, organic flame retardants (B). The content ratio (weight ratio) of (B-1) and (B-2) is preferably from 5/95 to 95/5 and more preferably from 70/30 to 20/80 in (B-1)/(B-2).

Compounds containing a triazine ring can be used as the non-halogen, organic flame retardants (B). The triazine compounds include compounds containing a triazine skeleton useful for improvement in flame retardance, for example, melamine or the derivatives thereof (melam, melem, melon, melamine cyanurate, sulfate melamine, borate melamine, silicate melamine, phosphate melamine, melamine resin, BT resin etc.), guanamine or the derivatives thereof (succinoguanamine, adipoguanamine, methylglutaroguanamine) and the like. Melamine/cyanuric acid adducts are particularly preferred.

The melamine/cyanuric acid adducts are compounds formed by melamine (2,4,6-triamino-1,3,5-triazine) and cyanuric acid (2,4,6-trihydroxy-1,3,5-triazine) and/or the tautomer thereof. Although the ratio of melamine and cyanuric acid mixed is not particularly limited, a value closer to an equimolar amount is preferred in order not to deteriorate the heat stability of the aromatic polyester resins.

The average particle diameter (by an electron microscope) of the triazine compounds is preferably less than 100 $\mu$m and more preferably less than 10 $\mu$m. This range prevents deterioration in processability for extrusion molding and mechanical properties of the resins.

The inorganic flame retardants include a variety of metallic compounds, for example, metal hydroxides such as calcium hydroxide, dolomite, hydrotalcite, etc., metal oxides such as tin oxide, zirconium oxide, etc., metal carbonates such as magnesium carbonate, zinc carbonate, calcium carbonate, barium carbonate, etc., metallic salts of boric acid such as zinc borate, zinc metaborate, barium metaborate, etc., and the like.

The content ratio of component (B) in the compositions is preferably from 1 to 60 parts by weight, more preferably from 1 to 50 parts by weight, and further preferably from 3 to 40 parts by weight to 100 parts by weight of component (A). Exceeding 1 part by weight causes the flame retardance to increase, and the ratio of 60 parts by weight or less results in preventing the flame retardance and mechanical properties from deteriorating.

The fillers of component (C) used in the invention are those having forms in general used as reinforcement materials for thermoplastic resins such as fibers, flakes, plates, whiskers, grains etc. Particularly, when the form is fibrous, fibers having the minimum or more length developing a reinforcing effect is particularly preferable. In view of operating characteristics and molding properties, fibers having a length of about 0.5 to about 20 mm and a diameter of about 5 to about 20 $\mu$m are desirable.

The materials of the fillers usable are inorganic substances (glass, carbon, silicon-containing compounds (silicon carbide, etc.), metals or metallic salts (e.g., alumina, tungsten, titanium, copper, potassium titanate, zinc carbonate, etc.), and the like) and organic substances (aramid fiber, etc.). In order to improve the adhesion of the resins to the fillers, the surfaces of the fillers can be treated with silane, epoxy, acrylic, a titanium trisalt coupling agent as long as the aim of the invention is not deteriorated.

The content ratio of component (C) in the compositions is less than 100 parts by weight, preferably from 5 to 100 parts by weight, and more preferably from 5 to 80 parts by weight to 100 parts by weight of component (A). The range enables prevention of problems such as decrease in fluidity and bad appearance of the molded articles.

The fluorine compounds of component (D) used in the invention are a component to inhibit droplets from falling in the course of combustion and to impart higher flame retardance. Component (D) is preferably polytetrafluoroethylene, polyhexafluoropropylene, (tetrafluoroethylene/hexafluoropropylene) copolymers, (tetrafluoroethylene/perfluoroalkyl vinyl ether) copolymers, (tetrafluoroethylene/ethylene) copolymers, (hexafluoropropylene/propylene) copolymers, polyvinylidene fluoride, (vinylidene fluoride/ethylene) copolymers, and the like. Among these, polytetrafluoroethylene, (tetrafluoroethylene/ethylene) copolymers and polyvinylidene fluoride are particularly preferable.

The content ratio of component (D) in the compositions is preferably from 0.1 to 5 parts by weight, more preferably from 0.1 to 3 parts by weight, and further preferably from 0.1 to 1 part by weight to 100 parts by weight of component (A).

Known additives, a stabilizer, an antioxidant, an ultraviolet absorber, a pigment or a dye can be added to the flame retardant resin compositions of the invention as long as the aim of the invention is not deteriorated.

The flame retardant resin compositions of the invention can be produced according to a process for producing known resin compositions wherein all raw materials are mixed with a mixing machine such as a tumbler, subsequently melted and kneaded with an extruder, and after cooling, pelleted with a cutter. However, when red phosphorus is used as component (B), it is desirable that red phosphorus is mixed with a base resin to make a masterbatch, and then melted and kneaded with other components. It is desirable that of component (C), a fibrous filler such as a glass fiber is not simultaneously blended with other components but supplied from a side feeder in the extruder to prevent damage of the filler as much as possible.

The present invention provides flame retardant resin compositions from which molded articles having excellent capabilities such as impact resistance, heat resistance, dimensional stability and the like, and further, excellent flame retardance, are obtained.

EXAMPLES

The present invention is specifically illustrated through Examples below. These are only illustrative, and the invention is not limited by these Examples. The following are used in Examples and Comparative Examples.

Component (A-1)

PBT: Polybutylene terephthalate "Dulanex 2000" produced by Polyplastics K.K. was used.

PET: Polyethylene terephthalate "Dianite MA" produced by Mitsubishi Rayon Co., Ltd. was used.

PA: UBE nylon 6 1030B produced by Ube Industries, Ltd. was used.

Component (A-2)

ABS resin (rubber-containing PS/AN copolymer):60 parts of a monomer mixture consisting of 74% of styrene and 26% of acrylonitrile were emulsified and polymerized in the presence of 40 parts by weight of polybutadiene latex having an average particle diameter of 0.3 $\mu$m. The resulting graft copolymer latex was solidified with sulfuric acid, neutralized with caustic soda, washed, filtered, and dried to obtain an elastic graft copolymer in the form of powder.

Component (A-3)

AS resin (PS/AN copolymer): Acrylonitrile, styrene and ethylbenzene as a solvent were used, the liquid mixture was continuously added into a polymerization reactor, and polymerization reaction was carried out at a temperature of about120° C. Thereafter, unreacted monomers were removed under vacuum to obtain powder of a copolymer. The acrylonitrile content of the copolymer was 23% by weight.

Component (A-4)

PPE: Poly(2,6-dimethyl-1,4-phenylene) ether BLENDEX HPP820 produced by GE Specialty Chemicals., Inc. was used.

PPS: A polyphenylene sulfide resin #140 produced by Tosoh Corp. was used.

Component (B)

Red phosphorus flame retardant: Red phosphorus flame retardant NOHVAEXCEL 140 produced by Rin Kagaku Kogyo K.K. was used.

Triazine compound: Melamine Cyanurate MC610 (average particle diameter: about 1 $\mu$m) produced by Nissan Chemical Industries, Ltd. was used.

Calcium phosphinate: That represented by the formula (II) produced by Taihei Kagaku Kogyo K.K.

Component (C)

Filler: Short fibrous glass filler ECS03T produced by Nippon Denki Glass K.K. was used.

Component (D)

Fluorine compound: Teflon 6-J of Mitsui Du Pont Fluoro Chemical K.K. was used.

(Impact Resistance)

About injection molded specimens having a thickness of ¼" inch, an Izod impact test (samples with a notch were used) was carried out according to ASTM D256 to evaluate the impact resistance thereof as Izod impact strength.

(Heat Resistance Test)

About injection molded specimens having a thickness of ¼" inch, the heat deflection temperature (HDT) (1.82 MPa) was measured according to ASTM D648-82 and evaluated.

(Dimensional Stability)

Molding shrinkage was measured according to ASTM D955 and evaluated.

(Flame Retardance)

A vertical flammability test was carried out on the basis of the UL-94 standard by use of injection molded articles having a thickness of 1/16" inch to evaluate whether or not the articles reach V-0.

Examples 1 to 5 and Comparative Examples 1 to 6

In the content ratios as shown in Table 1 ((A-1) to (A-4) are indicated by % by weight, and others are indicated by parts by weight to 100 parts by weight in total of (A-1) to (A-4)), all components except a filler of component (C) are mixed with a tumbler, and then melted and kneaded by use of a biaxial extruder to obtain a flame retardant resin composition in the form of pellet. A cylinder temperature was set at 250° C., and the filler of component (C) was side-fed in the extruder. The resulting pellets were subjected to injection molding at a cylinder temperature of 250° C. and a mold temperature of 60° C., and about the resulting molded articles, capabilities of mechanical properties, etc. and flame retardance were evaluated. Results are shown in Table 1.

TABLE 1

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| (A-1) | | | | | | | | | | | |
| PBT | 50 | 70 | | 70 | 70 | 50 | 70 | 70 | | 95 | 70 |
| PET | | | 70 | | | | | | | | |
| (A-2) | 32 | 17 | 17 | 17 | 17 | 35 | 20 | 20 | 60 | | 17 |
| ABS Resin | | | | | | | | | | | |
| (A-3) | 13 | 8 | 8 | 8 | 8 | 15 | 10 | 10 | 35 | | 8 |
| AS Resin | | | | | | | | | | | |
| (A-4) | 5 | 5 | 5 | 5 | 5 | | | | 5 | 5 | |
| PPE | | | | | | | | | | | |
| (B) | | | | | | | | | | | |
| Red Phosphorus | 10 | 8 | 3 | 6 | 10 | 10 | 8 | | 6 | 5 | 10 |
| Triazine Compound | | | | 10 | | | | 10 | | | |
| (C) | 50 | 50 | 50 | 50 | | 50 | 50 | 50 | 50 | 50 | |
| Filler | | | | | | | | | | | |
| (D) | 0.5 | 0.5 | | | 0.5 | 0.5 | 0.5 | | 0.5 | | |
| Fluorine Compound | | | | | | | | | | | |
| Izod Impact Strength [J/m] | 103 | 96 | 81 | 79 | 4 | 103 | 96 | 81 | 50 | 39 | 4 |
| HDT [° C.] | 150 | 200 | 210 | 200 | 100 | 150 | 200 | 200 | 110 | 210 | 90 |
| Molding Shrinkage Factor [%] | 0.2 | 0.3 | 0.3 | 0.3 | 1.2 | 0.2 | 0.3 | 0.3 | 0.1 | 1.1 | 1.2 |
| UL94 1/16" | V-0 | V-0 | V-0 | V-0 | V-0 | Spec Out | Spec Out | Spec Out | Spec Out | V-0 | Spec Out |

Examples 6 to 13 and Comparative Examples 7 to 11

In the content ratios as shown in Table 2 ((A-1) to (A-4) are indicated by % by weight, and others are indicated by parts by weight to 100 parts by weight in total of (A-1) to (A-4)), flame retardant resin compositions are obtained similarly to Examples 1 to 5. The resulting pellets were subjected to injection molding at a cylinder temperature of 250° C. and a mold temperature of 60° C., and about the resulting molded articles, the evaluation of capabilities of mechanical properties, etc. and flame retardance were carried out. Results are shown in Table 2.

TABLE 2

| | Example | | | | | | | | Comparative Example | | | | |
|---|---|---|---|---|---|---|---|---|---|---|---|---|---|
| | 6 | 7 | 8 | 9 | 10 | 11 | 12 | 13 | 7 | 8 | 9 | 10 | 11 |
| (A-1) | | | | | | | | | | | | | |
| PBT | 70 | 70 | 70 | 70 | | | 60 | 70 | 70 | 70 | | 70 | 100 |
| PA | | | | | 70 | 70 | 10 | | | | 70 | | |
| (A-2) ABS Resin | 10 | 25 | 10 | 25 | 10 | 25 | 10 | 10 | 30 | 30 | 30 | 30 | |
| (A-3) AS Resin | | | | | | | | | | | | | |
| (A-4) | | | | | | | | | | | | | |
| PPE | | 5 | | 5 | | 5 | | 20 | | | | | |
| PPS | 20 | | 20 | | 20 | | 20 | | | | | | |
| (B) | | | | | | | | | | | | | |
| Red Phosphorus | 8 | 8 | 6 | 6 | 8 | 8 | | | 10 | 6 | 8 | | 15 |
| Triazine Compound | | | 10 | 10 | | | | | | 10 | | | |
| Ca Phosphinate | | | | | | | 40 | 30 | | | | 40 | |
| (C) Filler | 50 | 50 | 50 | 50 | 50 | 50 | 50 | 50 | 50 | 50 | 50 | 50 | 50 |
| Izod Impact Strength [J/m] | 80 | 80 | 70 | 70 | 90 | 90 | 50 | 40 | 100 | 70 | 100 | 25 | 50 |
| HDT [° C.] | 200 | 200 | 200 | 200 | 200 | 200 | 200 | 200 | 200 | 200 | 200 | 200 | 200 |
| Molding Shrinkage Factor [%] | 0.3 | 0.3 | 0.3 | 0.3 | 0.3 | 0.3 | 0.3 | 0.3 | 0.3 | 0.3 | 0.3 | 0.3 | 0.7 |
| UL94 1/16" | V–0 | V–0 | V–0 | V–0 | V–0 | V–0 | V–0 | V–0 | Spec Out | Spec Out | Spec Out | Spec Out | V–2 |

What is claimed is:

1. A flame retardant resin composition comprising: 100 parts by weight of a thermoplastic resin (A) comprising 80 to 10% by weight of (A-1) at least one resin selected from the group consisting of an aromatic polyester resin and a polyamide resin, 17 to 85% by weight of at least one copolymer selected from the group consisting of a rubber-containing copolymer of a vinyl cyanide and an aromatic vinyl (A-2) and a copolymer of a vinyl cyanide and an aromatic vinyl (A-3), and 3 to 40% by weight of (A-4) a polyphenylene ether resin; 1 to 60 parts by weight of weight of a red phosphorus (B); and no more than 100 parts by weight of a filler (C).

2. A flame retardant resin composition comprising: 100 parts by weight of a thermoplastic resin (A) comprising 80 to 10% by weight of (A-1) at least one resin selected from the group consisting of an aromatic polyester resin and a polyamide resin, 17 to 85% of at least one copolymer selected from the group consisting of rubber-containing copolymer of a vinyl cyanide and an aromatic vinyl (A-2) and a copolymer of a vinyl cyanide and an aromatic vinyl (A-3), and 3 to 40% by weight of (A-4) a polyphenylene sulfide resin; 1 to 60 parts by weight of a red phosphorus (B); and no more than 100 parts by weight of a filler (C).

3. The composition as claimed in claim 1, wherein the aromatic polyester resin (A-1) is polyethylene terephthalate or polybutylene terephthalate.

4. The composition as claimed in claim 2, wherein the aromatic polyester resin (A-1) is polyethylene terephthalate or polybutylene terephthalate.

5. The composition as claimed in claim 1, which further comprises a polycarbonate resin (A-5) as the thermoplastic resin (A).

6. The composition as claimed in claim 2, which further comprises a polycarbonate resin (A-5) as the thermoplastic resin (A).

7. The composition as claimed in claim 1, in which the red phosphorus (B) is a red phosphorus coated with a member selected from the group consisting of a metal oxide, a metal hydroxide and a thermosetting resin.

8. The composition as claimed in claim 2, in which the red phosphorus (B) is a red phosphorus coated with a member selected from the group consisting of a metal oxide, a metal hydroxide and a thermosetting resin.

9. The composition as claimed in claim 1, which further comprises a fluorine compound (D).

10. The composition as claimed in claim 2, which further comprises a fluorine compound (D).

11. A process for producing the flame retardant resin composition of claim 1, comprising the steps of blending red phosphorus with at least one base resin selected from the group consisting of the aromatic polyester resin, the rubber-containing copolymer of a vinyl cyanide and an aromatic vinyl copolymer, the copolymer of a vinyl cyanide and an aromatic vinyl copolymer and the polyphenylene ether resin to obtain a master batch, and melting and kneading the masterbatch of the other components.

12. A process for producing the flame retardant resin composition of claim 2, comprising the steps of blending red phosphorus with at least one base resin selected from the group consisting of the aromatic polyester resin, the rubber-containing copolymer of a vinyl cyanide and an aromatic vinyl copolymer, the copolymer of a vinyl cyanide and an aromatic vinyl copolymer and the polyphenylene sulfide resin to obtain a masterbatch, and melting and kneading the masterbatch with the other components.

13. A molded article prepared by injection-molding the flame retardant resin composition of claim 1.

14. A molded article prepared by injection-molding the flame retardant resin composition of claim 2.

* * * * *